Jan. 7, 1958  O. K. KELLEY  2,818,708
HYDRAULIC TORQUE CONVERTER FLUID SUPPLY AND COOLING SYSTEM
Original Filed Dec. 11, 1947  6 Sheets-Sheet 5
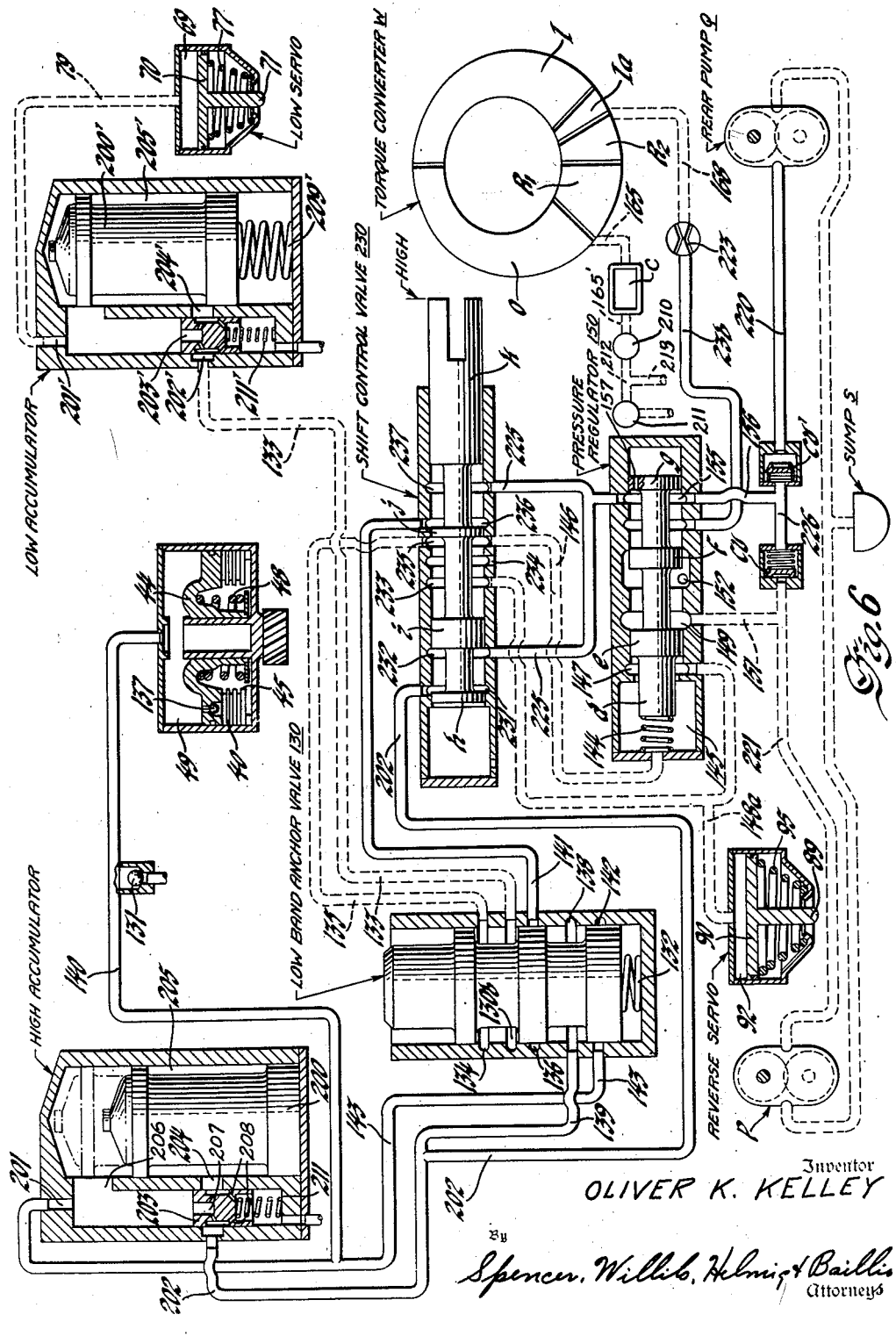
Inventor
OLIVER K. KELLEY
By
Spencer, Willis, Helmig & Baillie
Attorneys Jan. 7, 1958 O. K. KELLEY 2,818,708
HYDRAULIC TORQUE CONVERTER FLUID SUPPLY AND COOLING SYSTEM
Original Filed Dec. 11, 1947 6 Sheets-Sheet 6
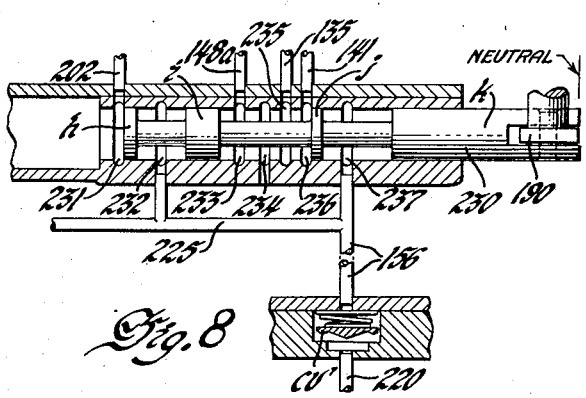
Fig. 8
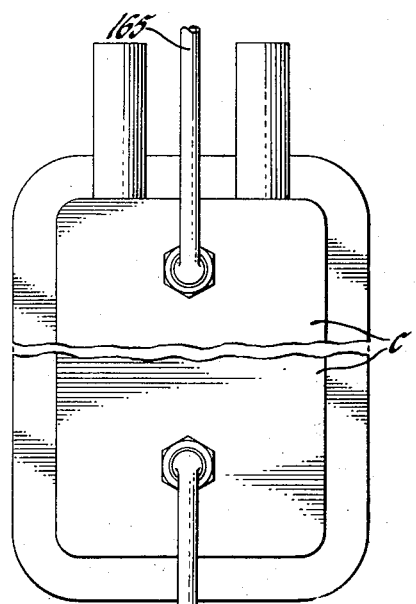
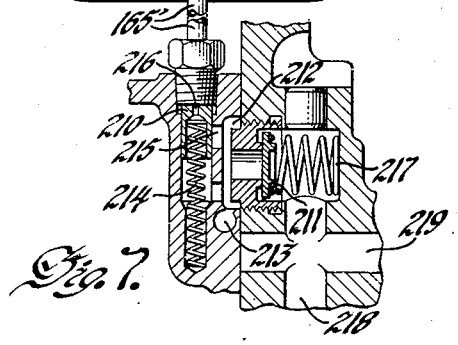
Fig. 7
Inventor
OLIVER K. KELLEY
By Spencer, Willits, Helmig & Baillio
Attorneys

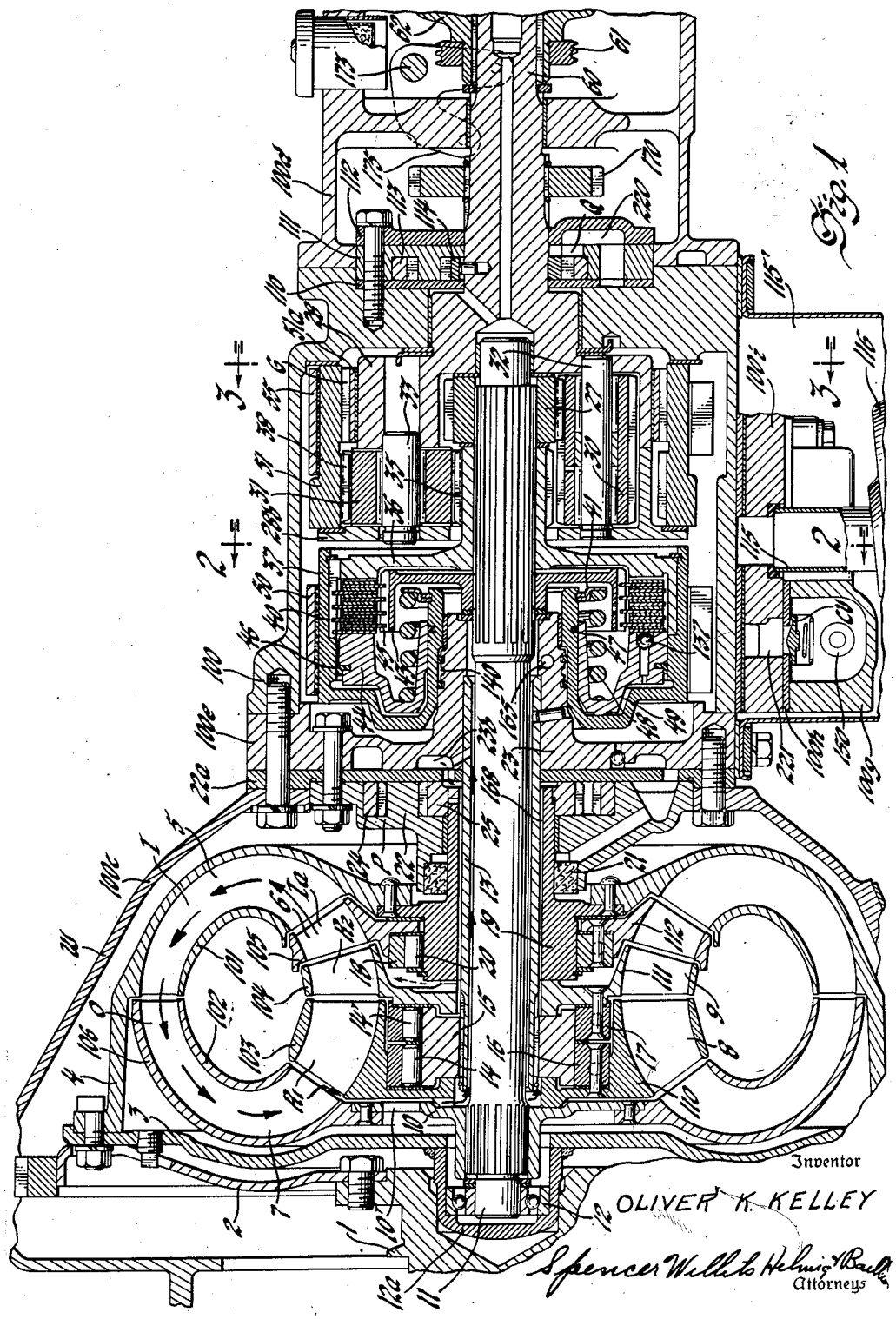

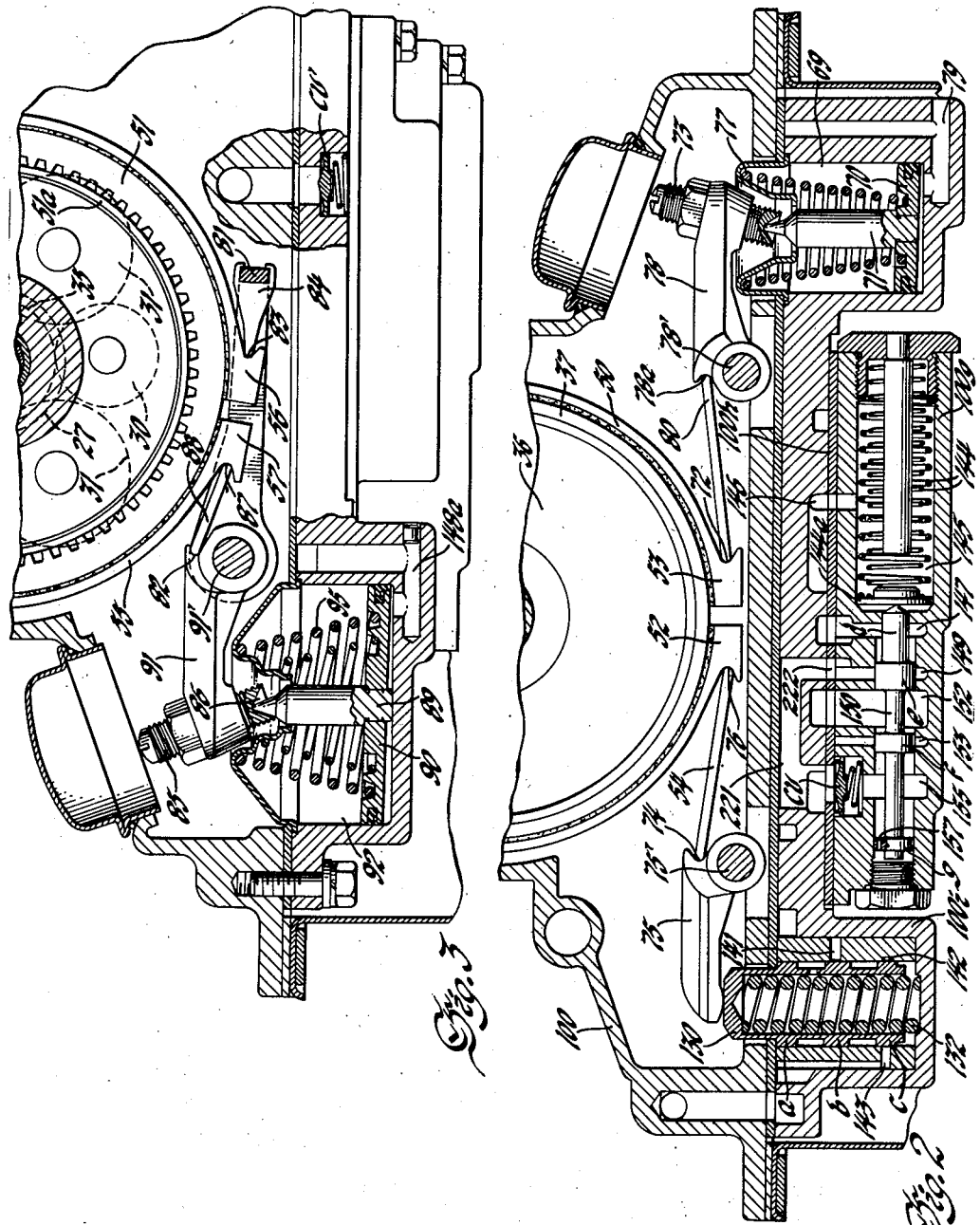

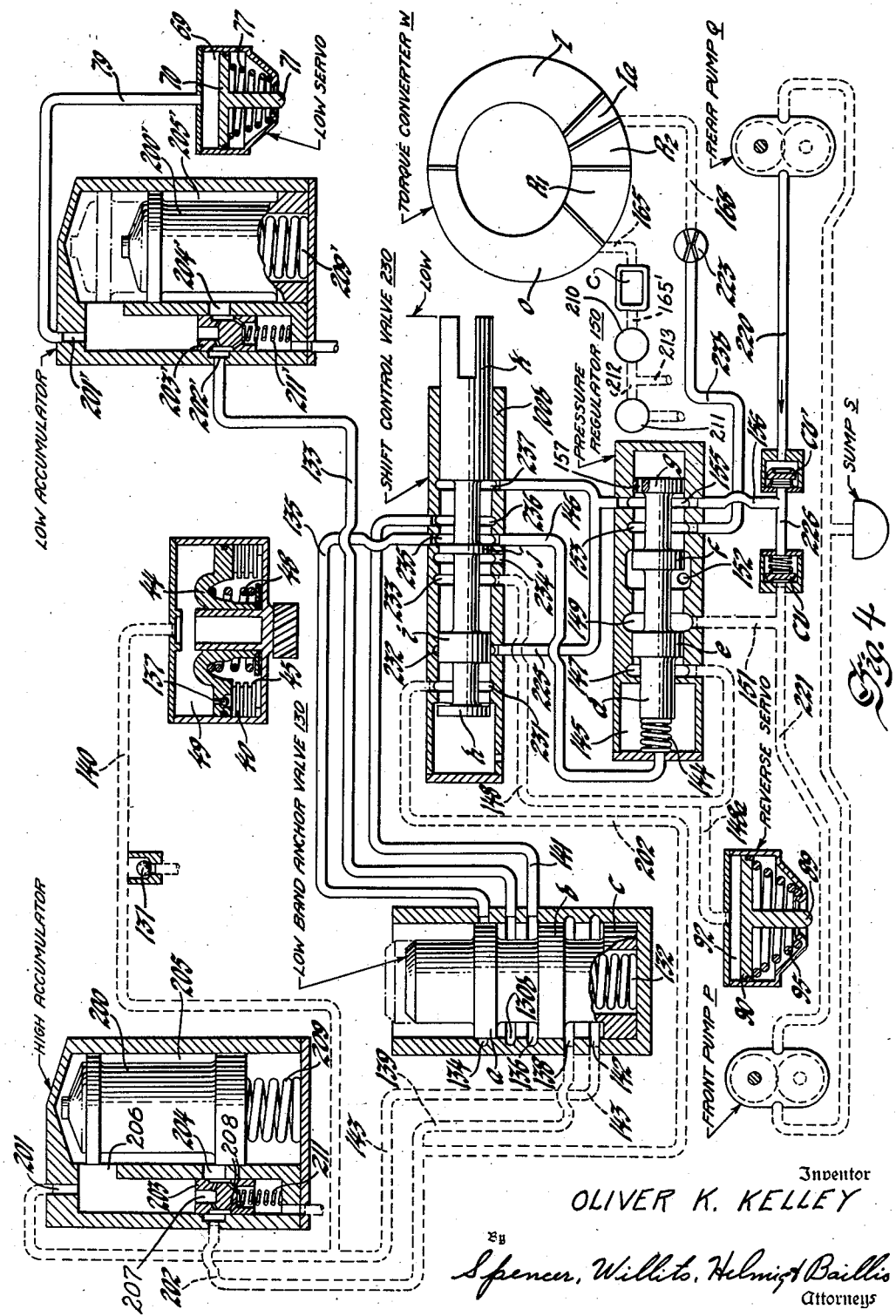

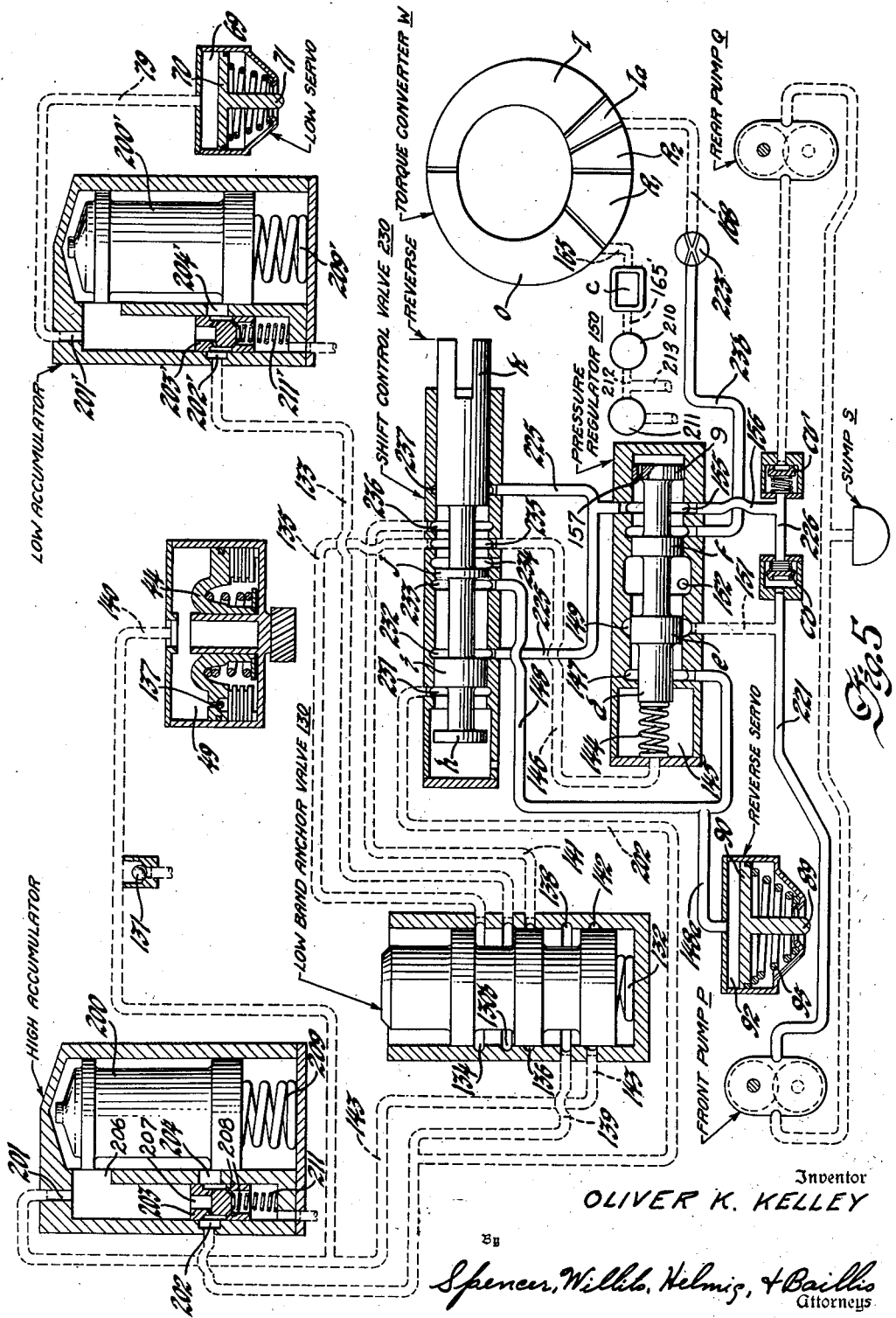

United States Patent Office 2,818,708
Patented Jan. 7, 1958

2,818,708

HYDRAULIC TORQUE CONVERTER FLUID SUPPLY AND COOLING SYSTEM

Oliver Kenneth Kelley, Birmingham, Mich., assignor to General Motors Corporation, Detroit, Mich., a corporation of Delaware Continuation of abandoned application Serial No. 146,723, January 23, 1950, which is a division of application Serial No. 790,950, December 11, 1947. This application March 17, 1954, Serial No. 416,751

3 Claims. (Cl. 60—54)

This application is a continuation of my application S. N. 146,723, filed January 23, 1950, Hydraulic Torque Converter Fluid Supply and Cooling System, which in turn is a division of my prior application S. N. 790,950, filed December 11, 1947, both of which applications are now abandoned.

The invention relates broadly to a combination of fluid torque converter and gear drive mechanism which provides a range of conversion of torque through a hydraulic torque converter, and provides for uninterrupted changing of the driving torque of the associate gear mechanism by fluid pressure means, and to an arrangement of devices, elements and fluid connections for providing a fluid supply and cooling system for same.

The invention further pertains to the utilization of plural pump fluid pressure supply means controlled for providing both the torque converter and the gear change mechanism, in which the supply means are made automatically effective for all of the required operations of the assembly under all drive conditions.

An object of the invention is to provide an arrangement embodying a fluid pressure actuated ratio changing mechanism effective for direct forward drive, low ratio range drive and for reverse drive; the fluid pressure actuation mechanisms being supplied by constantly available line pressure derived from said system, automatically maintained, and controlled by a single valve, manually selected.

An additional object is to provide a fluid pressure supply system for the aforesaid constructions which maintains a positive pressure in the working space of the torque converter, while maintaining through the same, a steady flow of fluid which is traversed through a cooler device, the flow continuing under all drive conditions.

It is an object of the invention to utilize pressure control valving which automatically maintains the flow of fluid to the torque converter working space, while simultaneously maintaining steady line pressure for the operation of the fluid pressure ratio actuating system. In this connection it is a sub-joined object to control the magnitude of the ratio actuation pressure by a change of selected speed ratio, such that the available pressure for performing the fluid pressure actuation operations will be varied in proportion to the degree of torque multiplication required.

The present invention utilizes a special form of torque converter which is capable of delivering full torque acceleration from maximum reduction to substantial 1-to-1 drive without interruption, and utilizes a special form of torque-regulated gear ratio shift system which inherently controls the transfer of torque from one forward drive ratio to the other by devices which measure not only the degree of existing torque, but also which establish a predetermined degree of torque overlap during the drive change intervals providing a need for supplementary heat absorption capacity in the fluid pressure system. The result of this combination is a drive assembly having units which inherently provide full ranges of torque multiplication with full capability of change between said ranges without surges of torque which could be noticed as shock accelerations or decelerations during the shift intervals. In other words, the combination stated above not only permits but also encourages the car driver to accelerate from standstill to full speed in either forward drive gear range or to initiate acceleration in one range and shift to the other during the acceleration interval, since there are no noticeable abrupt jerks or shocks in the drive. In practice with the motor car engines of the present day, this combination enables the car driver to obtain maximum performance when needed, without the inconvenience of performing any manual operation other than movement of a ratio control handle from one station to another. For ordinary use this stated shift of the control handle has been found unnecessary, and the lower range of speed ratio afforded, is used only for emergency low range drive purposes. It should be noted however that where the ultimate acceleration performance of the drive equipped with this invention is demanded, such is available. The control handle also serves as a parking brake controller. The provision of such increased flexibility creates a need for special arrangements to dispose of excess heat, which need herein is provided for in the routing of the fluid of the system through a cooler device.

As will be understood further the gear and clutch assembly is compartmented separately from the fluid torque converter, with supply pump passages connected through a casing web section between the converter and gear unit compartments. The construction provides unusual rigidity and exact alignment, while permitting space for converter fluid passages and the controls. A second web extension of the casing assembly at the rear of the gear unit is formed to house a pump which supplies the fluid pressure system under all driving conditions except initial drive when the vehicle is standing still.

Further advantages, novelties and new and useful results appear in the following description and attached drawings which represent one example of the invention herewith, in which:

Figure 1 is a cross section in elevation of an assembly of drive mechanism embodying the structures of the invention, at the left showing a fluid torque converter, in the center a drive gear unit, and at the right the output drive mechanism.

Figure 2 is a part section taken at 2—2 of Fig. 1 looking forward or to the left in Fig. 1.

Figure 3 is a similar section taken at 3—3 of Figure 1.

Figure 4 is a schematic diagram embodying the subject matter of the servo operating mechanism of Figs. 1, 2 and 3. The diagram shows the complete pumping system, and the master shift control valving, with the parts stationed in their low gear drive positions.

Figure 5 is like Fig. 4, but shows the fluid system as operative for providing reverse gear drive.

Figure 6 is similar to Figs. 4 and 5, but shows the system when operative for establishing direct drive by the gear unit of the assembly.

Figure 7 represents the arrangement of the fluid outflow passages from the converter and cooler, embodying the pressure control valving shown schematically in Figs. 4 to 6.

Figure 8 is a separate showing of the shift control valve of Figs. 4 to 6 for the purpose of indicating its operating connections and to show its neutral drive station.

Figure 1 is a vertical section taken through the transmission assembly of the invention, to show the relative positions of the parts and units. The vehicle engine is located at the left, and drives the unit next adjacent, W which is a fluid torque converter. This unit is arranged to drive the assembly output shaft 60 through a two-speed and reverse planetary gear unit.

The forward portion of the assembly is contained within the housing 100c, and the rear portion within the second housing 100 continuous with the first, the converter compartment section being denoted by 100c and the rear end section by 100d.

The engine crankshaft 1 has a flange bolted to a flex-plate 2 which is bolted to fly-wheel section 3 and to a drum 4 acting as a container for the converter unit W. The drum 4 comprises the shell or backing member for the impeller blades 5 of the converter, which deliver circulating liquid to the blades 7 of the output rotor O. A separate impeller rotor $I_a$ having its blades 6 located inward radially from the blades 5 has its hub 112 attached to a member 18 of a one-way device, and the race 18 with inner race 19 attached to drum 4, provide a channel for one-way device members 20. Blades 6 are held in core section 105. The member 18 is provided with cam slots set at an angle with respect to the direction of rotation as is now well known, such that the auxiliary impeller $I_a$ may rotate forwardly faster than the primary impeller I, but never slower than the latter.

The working space of the converter W is completed by two reaction rotors having blades 8 and 9, the first of which receives fluid from the rotor O, delivering same to reaction wheel blades 9, which latter in turn deliver the fluid to the auxiliary impeller $I_a$ having blades 6. A web 100e attached to the housing 100 has a radial flange bolted between sections 100c and 100, and a cylindrical sleeve portion 13 splined to the inner race member 15. The outer cam member 16 is attached to reaction rotor $R_1$, and the outer cam member 17 is attached to the reaction rotor $R_2$. One-way device locking members 14 lie between the members 15 and 16, and the one-way device members 14' lie between race member 15, and the outer member 17. These latter reaction-locking one-way devices by virtue of connection with the inner race member 15 and the non-rotating splined sleeve 13 of the part 100e, are arranged to prevent backward rotation of the reaction rotors $R_1$ and $R_2$ but to permit free forward rotation thereof.

The output rotor O is mounted on a hub 10 which is splined to the centrally located shaft 11, which is supported in a piece 12a fixed to the section 3 and supporting pilot bearing 12. The shaft 11 extends to the right where it is splined for sun gear 27 and clutch hub 43.

For convenience the main impeller having blades 5 may be denoted by I; the output turbine having blades 7 by O; the first reaction wheel with blades 8 by $R_1$, the second reaction wheel bladed at 9 by $R_2$, and the auxiliary impeller, supporting blades 6, by $I_a$.

The shell 106 and core section 102 support blades 7 of rotor O on hub 10. The hub 110 and core section 103 support blades 8 of rotor $R_1$. The hub 111 and core section 104 support blades 9 of rotor $R_2$. Blades 5 of impeller I are supported in core section 101 and drum 4. The fluid working space lies outside elements 101 to 105 and inside elements 4, 106, 110, 111 and 112, the fluid body of which has both toroidal gyration and rotation about the main axis.

Pumps P and Q are provided for maintaining the working space of the converter W filled at all times during its operating cycle, and for providing servo pressures required to actuate the speed ratio-determining elements of the gear unit, to be described further.

The front pump P is supported by the radial portion of the part 100e, against which is fitted the pump body 22 and plate 22a properly formed to accommodate the driven pump gear 24 and the driving pump gear 25 fixed to an axial extension of race piece 19 bolted to the drum 4. The ported plate 100e extends to the right of the joining of the housing sections 100 and 100c, being formed into an axial sleeve 23 which surrounds a portion of the shaft 11. The pump passages and conduits of the system will be described further in detail. The seal 21 is located between an inward radial extending portion of the pump body 22 and the axially extending portion of the drum 4.

The rear pump Q is assembled in the joining web of casing sections 100 and 100d, the pump assembly comprising three portions 110, 111 and 112. The portion 110 is a ported plate forming an endwall, the portion 111 is recessed and provides a spindle for the driven gear 113, the meshing driving gear 114 being keyed to shaft 60. The ported cover plate 112 completes the assembly, and is bolted to the endwall of casing section 100. The pump suction space is connected to suction main 115 open to the sump 115' through strainer 116.

The dashed arrows leading from space 23b of pump end plate 100e indicate the flow of oil from pump P to the converter working space, the passage 168 leading between members 13 and 19 radially inward of the seal 21 and the adjacent axial flange of drum 4. The oil flows radially outward between the hub 111 of rotor $R_2$ and the one-way clutch 18—19—20, and enters the space between the blades 6 of the auxiliary impeller $I_a$ and the blades 9 of the second reaction rotor $R_2$. Here the oil is accelerated into the circulatory flow, and a portion of the oil body escapes at the outer radial parting zone to flow into the space radially outward of, and to the left of turbine output member O, restrained between flange plate 3, drum 4, and the back of rotor shell 106. Another portion escapes between 7 and 8.

Oil is extracted from the working space stream, radially inward of the space between flange plate 3 and turbine member O, through passage 10' in hub 10, flowing inward at the right of hub 10, and along the space external of shaft 11 inside the axial portion of non-rotating casing element 100e and sleeve 13 and from thence radially outward by delivery passage 165 for connection to the flow control system of Fig. 8.

The gear unit G is made up of carrier 28 attached to or integral with shaft 60 and having a double set of meshing planets 30 and 31 supported on separate spindles 32 and 33 respectively, carrier 28 having web 28b at the left. The planets 30 extend to full width between the radial portions of the carrier 28 and mesh internally with the sun gear 27, and with the planets 31 as indicated in the upper part of Fig. 3. A second sun gear 35 is meshed with the planets 31 and is attached to a radial web 36 of drum 37, splined internally to accommodate clutch plates 40. The left portion of the drum 37 at its inward portion extends axially to the right, and is fitted with the keyed flange 41 acting as a spring retainer. The internal clutch plate hub 43 is splined to shaft 11, and is externally splined to accommodate plates 45, which mate with clutch plates 40. A clutch presser piston 44 is mounted to slide inside the drum 37 within the seal members 46 and 47, and is normally held to the left by clutch release spring 48, which bears against the flange 41. As will be understood further fluid pressure is admitted at the left in cylinder 49 between the radial wall of the drum 37 and presser or piston member 44 to compress the stack of clutch plates 40—45 for obtaining a locking couple between the sun gears 27 and 35 for establishing direct drive between shafts 11 and 60, through the gearing.

The drum 37 is surrounded by a brake member 50 so that it may be held against rotation and cause the sun gear 35 to stand still; this effect requiring the planet pinions 31 to roll around the sun gear 35. As will be understood, when brake 50 is actuated, the shaft 11 drives the shaft 60 at low gear ratio.

Surrounding the planet gears 31 is a meshing annulus gear 38 attached to drum 51 supported on bronze ring 51a bearing on a cylindrical face of carrier 28. The annulus gear 38 and drum 51 are surrounded by a brake 55 which is actuable for stopping the drum and sungear 38 to establish reverse gear drive between the shafts 11 and 60.

The rear portion of the gear box has the shaft 60 supported in the webs of sections 100, and 100d. The shaft 60 is splined for small speedometer gear 61 and for universal joint coupling sleeve 62. Leakage of oil from 100d is prevented by a seal of the universal joint connection housing, not shown.

As described to this point, the engine drives the torque converter W, which in turn drives the gear unit G, which determines one of three driving conditions for shaft 60; namely, low range, high range, or reverse gear drive.

Fig. 2 is a sectional view taken across the transmission to the right of the parting line between the housing sections 100e—100 at 2—2. This view is given to relate the fluid control system to the remainder of the structure, and to show the fluid pressure passages connecting the work units, the fluid working space of the converter, the valving, the accumulators and the pumps P and Q.

In this view the regulator valve 150 and the reaction torque measuring valve 130 are shown and may be referred to Figs. 4 to 6 for diagram correlation. The physical arrangement only is provided in Fig. 2, since it will be easier to follow the porting and passages in the diagrams of the other figures, following.

Fig. 2 shows a section of the actuating system for the brake member 50. The ends of the member 50 are formed into bosses 52 and 53, the boss 52 being notched at 76 for strut 54. A lever 75 is pivoted in the casing at 75', having a portion intersecting the travel of valve 130 and it notched for the adjacent end of the strut 54. The end 53 of band 50 is notched at 72 for strut 80 seated in notch 78a of lever 78 pivoted on the casing at 78'.

The lever 78 is fitted with adjustable alignment stud 73 which is notched for the end of rod 71, the latter being surrounded by release spring 77. Rod 71 is fixed to piston 70.

The housing 100 is formed to provide the cylinder 69 for the brake actuating piston 70, the rod 71 of which seats in the head of lever 78 also notched for strut 80 fitted into notch 72 lying radially inward of the boss 53. The boss 52 is moved by strut member 54 seated in notch 74 of lever 75 and notch 76 of boss 52. The brake releasing spring 77 serves to detach the band 50 from the drum 37 except when fluid pressure energization takes place.

Passage 79 is for admission of fluid pressure from the energizing servo system to the cylinder 69.

A somewhat similar arrangement is provided in Fig. 3 for the operation of the reverse brake 55, the section being taken at 3—3 of Fig. 1. Brake member and bosses 56 and 57 are provided. The boss 57 is notched at 87 for strut 88 which extends to fit into notch 86 of lever 91. The boss 56 is notched at 83 for anchor member 84. The piece 84 is restrained by a strap 81 which is looped around the pivot pin 91' for the purpose of referring the brake reactions to a common casing support. The lever 91 has adjustment stud 85 notched at 86 for piston rod 89. Piston 90 in cylinder 92 is fixed to rod 89, and held down by spring 95 except when lifting pressure is supplied by passage 148a.

Application of fluid pressure in cylinder 92 to the head of piston 90 causes the piston to travel upward against spring 95 to exert a thrust to the lever 91 to move strut 88, which forces the movable band end at 57 to the right to clamp band 55 on drum 51.

This motion compresses the springs 95, which later cause the band to release when the fluid pressure under the head of piston 90 is removed.

Actuating pressure for loading the plates 40, 45 of the direct drive clutch 40—45 of Fig. 1 is supplied by passages connecting the output of the pumps P and Q through control valving as diagrammed in Figs. 4 to 6, to cylinder space 49 inside drum 37 to move annular piston 44 against spring 58.

In the toothed gear unit G, the driving sun gear 27 meshes with the low range planet gears 30, and the reversing planet gears 31 mesh with both the reaction sun gear 35 and the reversing annulus gear 38. Shaft 11 is the gear unit input shaft.

Power applied to sun gear 27 is utilized for direct, reverse and emergency low gear drive of output shaft 60.

Direct drive is obtained by applying fluid pressure supplied from the system to clutch piston 44 causing plates 40—45 to couple or lock the unit.

Reverse is obtained by holding annulus gear 38 with brake 55.

Low gear is obtained by holding sun gear 35 and drum 37 with brake 50.

All of these shifts are controlled accurately by timing and coordinating devices operating through fluid pressure devices or agencies of the system which assure that there will not be any sudden lurches of torque. The fluid pressure system is arranged so that the vehicle operator may move the ratio shift controller for the valving at will, and obtain an extremely smooth ratio change under all driving conditions, as noted preceding. This system utilizes a mechanism which responds to the instant torque conditions, and applies a corrective factor to the servo pressure delivery lines involved.

Should the engine fail to start, towing or pushing the vehicle enables the rear pump Q to supply the hydraulic system requirements, as will be understood further.

The master regulator valve 150 of Figs. 2 and 4 to 6 is arranged so that the front pump P is unloaded after the rear pump Q reaches sufficient speed to supply the system. This shift point of pump load from P to Q is determined by the limit factors of the system, and may occur normally at some point, between 10 and 40 miles per hour, for example. Each pump is equipped with check valves CV and CV' respectively to prevent back flow when the pump is not providing it working pressure. Reference to Figs. 4 to 6 will show the relationship of the pump feed lines.

Fig. 2 is a sectional view of a portion of the transmission case to show the space arrangement of the brake actuator system and the corresponding control valve parts, physically located at the bottom of the transmission casing 100.

Band 50 around drum 37 is held by two struts 54 and 80, the strut 80 seating in a notch 78a of lever 78 pivoted at 78', the lever 78 having adjustable screw head 73 bearing against rod 71 of piston 70 in cylinder 69, the spring 77 tending to press the piston 70 toward the lower end of its stroke against actuating pressure which may be supplied by passage 79. The other strut 54 seats in a notch 74 of lever 75 pivoted at 75', bearing against anchor valve 130 loaded by spring 132. The operation of valve 130 is discussed further in connection with Figs. 4 to 6.

The pressure regulator valve 150 shown in Fig. 2 is discussed in detail in connection with Figs. 4, 5 and 6.

Fig. 3 shows a diagram of a brake operating mechanism, as used for brake 55 of Fig. 1. The operating mechanism for each of the brake bands include similar structures, the servo cylinder 92 and piston 90 operating a lever 91 which actuates the band 55 through strut 88 and piece 84 at the anchor end. The transmitted actuation force operates the movable end 57 through a mechanical advantage proportional to the length of arm 91 compared with the radial distance of pivot 91' from notch 82 in which the strut 88 rests. Spring 95 retracts the brake mechanism when pressure in passage 148a and cylinder 92 is relieved. The band 55 is also self-retracted. Piston rod 89 is press-fit into piston 90 which is grooved to act as a retainer for spring 95. A stroke adjustment screw 85 connects arm 91 with rod 89. The cylinder casing is drilled for passage 148a and other passages connecting therewith, as will be understood from study of Figs. 4 to 6.

In the information immediately following, the separate elements and groups of the servo pressure system are first individually discussed.

The direct drive clutch cylinder 49 shown in Fig. 4 has a given volumetric capacity, requiring filling before the final engagement interval, with a finite quantity of oil. To make final engagement smooth, the flow control for cylinder 49 is arranged to be diminished through the action of a differential pressure valve 200 connected to the clutch cylinder feed line 201, shown in Figs. 4 to 6.

In the initial stage the servo oil feed passage 202 admits clutch servo oil around the neck of dump valve 203, flowing freely and rapidly through port 204, valve passage space 205 and port 206 to the passage 201, connected to the clutch cylinder 49 of Fig. 1.

The bleed holes 207 and 208 in the valve 203 permit small quantities of oil to flow out above and below the valve 203, this occurring during the primary interval of filling of the clutch cylinder 49.

When clutch actuator piston 44 meets the resistance of plates 40—45, in Fig. 1, the back pressure reaction causes a rapid rise of pressure effective above valve 200 tending to shift the valve 200 of Fig. 4 downward against spring 209.

The upper boss of valve 200 then closes the accumulator valve space 205 from connection with clutch cylinder passage 201, and the latter from feed connection at port 204 with pump line pressure of passage 202. The clutch passage 201 is now only connected with the feed passage 202 through bleed hole 207 in the top of valve 203, which provides a slower pressure build-up on the clutch piston 44 as the spring 209 is compressed by valve 200.

When the back pressure in passage 201 equals pump or line pressure, the clutch 40—45 is fully engaged, and valve 200 is at its lowermost point with spring 209 fully compressed.

When the control valving for passage 202 is connected to exhaust, outflow from clutch passage 201, bleed hole 207, and from the space below valve 203 through bleed holes 208 begins. Since the relief of the small volume of oil under valve 203 through 208 occurs more quickly, the force of spring 209 on piston valve 200 exerted on the oil body overcomes the resistance of valve spring 211, causing valve 203 to move down and open the space 201 through space 205 to space 202, for rapid release of the clutch. The valve 200 may now move upward to its former position urged by spring 209, and valve 203 likewise returns.

The operational results of this combination of accumulator and dump valves are rapid clutch cylinder filling, gradual clutch engagement, and rapid relief for disengagement.

The diagram arrangement of Figs. 4 to 6 shows both of these accumulator-and-dump valve combinations, one for the direct drive clutch control and the other for the control of the pressure which operates brake 50 for establishing the low gear range. The accumulator parts for the control of low brake 50 are prime numbered to correspond to the comparative parts for the control of clutch 40—45. In Figs. 4 to 6, the clutch control accumulator is located upper left, and the brake control accumulator, upper right.

A special provision for further correlating the action of the low gear band 50 and the clutch 40—45 is disclosed. This enables the shift between low and high range to be made with particular smoothness, and a minimum of torque slip.

The low gear servo feed lines 135, 133, 141 and the direct drive clutch feed lines 143, 139 are effectively routed through the anchor valve porting so that the valve response to reaction torque furnishes a regulatory control both on the application of clutch 40—45 and low band 50.

Upon shift into low as determined by the shifter valving of Figs. 4 to 6, the anchor valve 130 is first placed in its upper position until there is mechanical drag induced by low gear drive reaction between band 50 and drum 37, which forces the valve 130 to move against spring 132 to the lower position, in which port 134 is closed by the boss $a$, ports 130$b$ and 136 are connected, and ports 138 and 142 are connected as in Fig. 4. The low servo passage 133 is now fed through the ports 130$b$ and 136 by relay passage 141 from the positioning of control valve 230.

The valve 130 is held down during the drive torque interval of low gear, and may only rise momentarily under high speed coasting conditions.

When the valve 230 of Figs. 4 to 6 is shifted to the direct drive feed position, under torque, the feed to port 136 by line 141 continues while the feed by line 135 to port 134 is exhausted at port 234 of valve 230.

Pressure from line 141 through ports 136, 130$b$ through line 133 maintains the holding force on the low gear actuator piston 70.

Pressure from shifter valve port 231 in line 202 is fed to port 139 of valve 130, in communication through port 142 with line 143, to provide a direct feed of pressure into space 201 of Figs. 4, 5 and 6. This provides quick filling of the clutch cylinder and partial depression of piston 200 against spring 209 as described above.

Pressure in passage 201 is open to clutch cylinder passage 140 to initiate the assumption of the torque by the clutch plates, so that a condition exists in which no further torque is carried by the low reaction gearing.

As the clutch plates 40—45 are loaded by piston 44 the force of torque reaction on the band 50 falls off, since the plates now sustain an increasing torque fraction. Valve 130 therefore moves urged by the torque-reaction measuring spring 132.

This is the critical point of the torque reversal in the shift. The clutch holding power must be built up to a higher value so that the engine may be decelerated or pulled down to a speed commensurate with 1-to-1 ratio, without a noticeable surge in the delivery of torque.

When the spring 132 has moved valve 130 upward a given distance as an index of a calibrated minimum of torque reaction, the valve 130 opens the port 130$b$ and passage 133 to exhaust through port 134 and line 135 via the shifter valving, releasing pressure from the brake cylinder 69 and releasing band 50. At this point the valve 130 has blocked communication between ports 142 and 138 which interrupts the rapid filling which had been going on through line 143. Further clutch filling now proceeds, feeding through the orifice 207 of valve 203 as described. After this action the plates 40—45 are fully engaged under full pressure and the shift to direct has been controlled on a basis of exactly measured torque reaction, with the torque overlap action itself as the master control force. By this process, the engine cannot run away, and there is no lurch or bump in the overall drive of shaft 60.

When the shift control valving of Figs. 4 to 6 is moved to establish low, the anchor valve 130 is moved through the inverse sequence of flow control operations, the timing action being substantially the same for smooth transfer from direct coupled gear torque to reduction torque reaction.

At this point, the action of the master pressure regulator valve 150 of Figs. 4 to 6 is required to be studied in detail before dealing with the overall control operations of the diagrams of Figs. 4 to 6.

The valve 150 is fitted in a bore of casing 100$b$, and has an end portion $d$ of one diameter, and three bosses $e$, $f$, and $g$ of a different diameter. The end $d$ is loaded by spring 144 in space 145 connected by passage 146 to the control valving of Figs. 4 to 6.

Port 147 connects to passage 148, port 149 to front pump feed passage 151, port 152 to the sump or spent pressure spaces, port 153 to passages 23b, 168 leading to the working space of the converter W, and port 155 is joined to line 156 connected to the pressure delivery space of the pumps P and Q between the check valves CV and CV'.

Valve 150 determines the ratio shift actuation pressure, and controls the shift of loading of the front pump P with respect to the loading of rear pump Q. Bleed hole 157 connects the spaces on either side of boss g.

In initial rest position, valve 150 closes the port 153 to prevent loss of fluid from the converter working space through passages 23b and 168. Rise of pump pressure in passage 156 moves the valve 150 against spring 144, opening port 153 to fill the remaining converter space and building up the pressure thereof. Upon reaching the predetermined operation equilibrium pressure, excess oil drains to sump by large port 152, to maintain the desired level of operation pressure.

Rise of vehicle speed to a given value enables the rear pump Q to provide the required pressure and capacity, and the valve 150 opens port 149 to 152 by-pass the line 151 of pump P, which is now unloaded. For example, the pressure value at this stage could be 90 pounds p. s. i., entirely sufficient to operate the direct drive clutch.

For practical reasons, it is desirable to use a higher pressure for operation of the low and reverse bands 50 and 55, therefore reactive augmenting of the force of calibrating spring 144 is provided by the passage 146 and space 145 connected to the low servo valve port 235 of Figs. 4 to 6, and operating on the pressure area of boss d; and for the same effect for reverse, pressure in passage 148 and port 147 is applied over the area of boss e. This arrangement introduces a resistance to the motion of the valve 150 toward relief at port 152, such that a higher pressure is developed in the servo feed lines before valve 150 can begin to relieve.

This higher level of pressure may be set at a value approximating 180 pounds p. s. i., by the design of the elements of the system.

The foregoing information appears required prior to dealing with the overall controls, and Figs. 4, 5 and 6 are later discussed in the light of the separate descriptions of the elements and groups.

In Fig. 2, the actual assembly detail of regulator valve 150 of the fluid system is given as distinct from the schematic views of Figs. 4 to 6. The plate section 100g is bored for the valve 150 and drilled for the porting which is coordinated with the various passages of the fluid pressure system. The section 100g is fastened to housing section 100i by bolts or other convenient means. The valve portions are assembled by means of cap screws. The portion d of the valve is used as the area for low gear drive pressure reinforcement for which the spring retainer 144a is loosely fit or else drilled through so that the reactive pressure supplied by line 146 is only effective on the area end of d. The check valve CV is assembled in plate 100g seating on insert 100h and is connected to passage 221 and passage 222 for port 149. The oil flow from the front pump P feeds thru CV and enters port 155 between bosses f and g, and is effective upon boss g through bleed hole 157, and upon boss f to oppose the springs 144 while moving valve 150 in the opposite direction. Under a given design pressure and spring force, the port 153 connected to the converter feed lines 23b and 168, is exposed, as noted above. When boss f is shifted to expose outlet port 152, the leakage equilibrium pressure zone is established, and the line pressure in port 155 and the connected passages is so determined. Reinforcing pressure for low gear and reverse band actuation is obtained by the admission of pressure to ports 146 and 147 respectively, as described further below.

Fig. 4 is to show the operating characteristics of the control system for drive in low under actuation of brake band 50.

The front and rear pumps P, Q may one or both supply port 155 of valve 150 connected to ports 232 and 237 of ratio shifter valve 230, now first described.

The force of spring 144 of valve 150 as noted, is augmented by pressure in space 145 and passage 146 obtained from port 235.

The schematic diagrams of Figs. 4 to 6 provide a coordination of the subject matter. The clutch and brake servo operating mechanism is sechematically indicated.

The shift control valve 230 of Figs. 4 to 6 is fitted in a bore in casing section 100b, or a section adjacent thereto, and has four bosses h, i, j and k from left to right as shown. The casing is ported at 231, 232, 233, 234, 235, 236 and 237 from left to right.

The port 231 is connected to passage 202 jointed to the inlet of the direct drive accumulator pilot valve 203, and to passage 139 and to port 138 of the low gear anchor valve 130.

The port 232 is connected with port 237 by passage 225 connected to port 155 of the regulator valve 150. Passage 156 cross connects 155 with the passage 226 joining the valves CV and CV'.

The port 233 is connected by passages 148, 148a with cylinder 92 of the reverse band piston 90, and to port 147 of the regulator valve 150.

The port 234 is the exhaust port.

The port 235 is connected by passage 135 with port 134 of the anchor valve 130, and also by passage 146 leading to space 145 of the regulator valve 150.

Port 236 connects by passage 141 with port 136 of the anchor valve 130.

In Fig. 4 the shift control valve 230 is shown in the low gear drive-establishing position.

Pressure from regulator output passages 155 and 225 is cut off in port 232, but delivered through ports 235 and 236, the latter delivering to passage 141 and through ports 136 and 130b of valve 130 to line 133, acting in 202' and 201' to hold accumulator valve 200' down, and in passage 79 leading to cylinder 69 for holding the low gear band 50 of Fig. 2 through the force applied to piston 70.

The pressure of line 135 is cut off by boss a of valve 130 at port 134. Pressure in port 235 and line 146 is active on the leftward face of boss d of valve 150, in space 145, to cause the net effective line pressure to be raised. As noted above, the anchor valve 130 is movable under torque reaction to regulate the loading interval for band 50 and clutch 40—45.

Feed of pressure to maintain the converter (W) working space filled is provided by port 153, line 23b, metering orifice 223, and line 168.

Should road speed fall off, the regulator valve 150 would be shifted by spring 144 at a predetermined pressure and valve CV would admit pressure from line 221 to line 156, for providing the system from the front pump P, while stopping delivery from the rear pump Q. Fall of line pressure permits valve 150 to cut off the drain of port 149 so as to introduce the pressure of pump P to the line 156. It will be noted that the effective line pressure in 226, 156 from pump Q may hold the valve CV on its seat, while front pump pressure in lines 221, 151 is relieved through port 149 to drain port 152 between bosses e and f of valve 150. This is the normal operating condition under all appreciable road speeds.

The positioning of valve 230 in Fig. 5 compared with that of Fig. 4 is to the left, the boss k closing input feed port 237, cutting off the feed to ports 235, 236 and pressure lines 135, 141 and 146, and venting them at port 234.

Pressure feed is delivered from passage 225 to port 232, across the valve space between bosses *i* and *j* to port 233 and lines 148, 148a, taking effect in port 147 to augment the force of spring 144 on regulator valve 150; and is exerted in cylinder 92 to load piston 90 against spring 95 to actuate reverse band 55 of Figs. 1 and 3.

As before, the converter W is maintained under pump line pressure supplied by pump P through check valve CV, line 156, ports 155 and 153, line 23b, restriction orifice 223, and passage 168. The boss *e* of valve 150 closes port 149 and line 151.

It should be remembered that when shaft 60 is driven reversely, the rear pump Q, revolving backwards, would tend to drain the passage 220, so that check valve CV', urged by pressure in line 226 as well as by its own spring, will then close, permitting pump P to supply the system. This effect will be understood when one appreciates that the line 220 of pump Q becomes a suction line.

Reference is made to Fig. 8 where the ratio control valve 230 appears. In this view it will be noted that the valve is stationed to the right of the high ratio showing of Fig. 6—which is neutral.

Shift of ratio control valve 230 to the right of the position shown in Fig. 4 to that of Fig. 6 causes the pressure which had been actuating the low gear band piston 70 to be cut off at port 236 from line 141, and opens port 232, 231, and line 202 leading to valve 203, to deliver to passage 201 and passage 140 connected to cylinder 49 for actuating clutch piston 40. This pressure is also delivered to passage 139 preceding valve 203 and to passage 143, connected to ports 142 and 138 of anchor valve 130.

The above-described transition control by valve 130 takes place during this up-shift action.

The pumps P and Q supply the transmission shift controls, the lubrication system and maintain the converter (W) working space under positive pressure at all times. The master pressure regulator valve 150 feeds the working space through a metering orifice 223 and provides a no-rotation cut-off action to maintain the quantity of fluid in the converter against idle drainage.

This feed is supplied in the inter-rotor space, between the impeller blades 6 and the stator or reaction member 9, and outflow from the converter emerges in the inner radial zone between the driven turbine rotor 7 and the stator member 8. It is thought novel in this combination to admit the input working space fluid at a point where it is immediately subject to acceleration from a low to a high kinetic state. The converter rotation applies force to circulate this oil body without expensive and complicated injector and ejector means, providing sufficient velocity of motion to guarantee rapid movement through the externally located coolers, yet avoiding fluid voids in the working space body by maintenance of positive pressure therein.

On the outflow side of this dynamic flow system, in the passage 165' are located two relief valves 210 and 211. The first of these 210 is set to relieve at a given value, for example 50 p. s. i., its overflow going by passage 212 to valve 211, which may be set to relieve at a lower value, for example 15 p. s. i. The 15-pound space is connected by passage 213 to the transmission lubrication spaces, while the overflow of valve 211 relieves to the sump.

Fig. 7 shows the relative positioning of the cooler or heat exchanger in the fluid system.

The cooler C receives oil under pressure from the converter working space in pipe 165 and delivers it to pipe 165". The valve 210 has leakage hole 216 in its top center to permit a constant continuing quantity of flow toward the sump, and its upper face acts as a seal limited by the force value of spring 214. In a given design, this spring-and-valve combination would be set to permit full outflow at port 215 into space 212, under 50 p. s. i., in line 165'.

The valve 211 is exposed to the pressure of space 212 and relieves by yielding of spring 217, to spill the excess oil into the spent pressure passages 218 and 219 at a design pressure, for example, of 15 p. s. i. The passage 213 leads to the various lubrication channels for the converter and gearing, to maintain same under positive pressure.

Orifice 223 serves to limit the amount of oil required by the torque converter so that the small pump Q can provide the system at an early car speed and relieve the larger pump P to curtail horsepower loss.

The function of orifice 223 of Figs. 4 to 6 is to maintain a controlled circulation through the converter W, avoiding excess flow through the working space which could generate churning losses, also.

The valve 210 set at a given pressure level maintains a static level pressure in the working space, preventing cavitation. The valve 211 provides further staged regulation of the working space outflow, and gives a convenient point from which to tap for lubricant flow to the running parts, at outlet 213.

The rod 190 for moving valve 230 is shown in Fig. 8.

The end of valve 230 of Fig. 8 is moved by external mechanism through reverse, low, direct, neutral and parking positions.

The fluid torque converter W while operating on the well-known principles of closed-circuit fluid turbines, has some unique features. The impeller blades 5 are secured between the shell of drum 4 and core section 101; the output rotor blades 7 are secured between shell section 106 attached to hub 10 and core section 102; the first reactor blades 8 are secured between hub member 110 and core section 103; the second reactor blades 9 are secured between hub member 111 and core section 104; and the auxiliary impeller blades 6 are secured between core section 105 and hub member 112.

Rotation of the impeller I when rotor O is standing still lifts the fluid of the working space formed between the members 4, 106, 110, 111 and 112, and the core sections 101, 102, 103, 104 and 105, from the inner radial zone to the outer radial zone of the converter, impinging the fluid against the blades 7, the centrifugal force imparted to the oil body now possessing kinetic energy. Since output rotor O is standing still, the moving oil body tends to flow around the working space counter-clockwise in Fig. 1 in a toroidal manner. The resistance of blades 7 causes this flow to proceed around the working space in the inner radial direction through the reaction rotors $R_1$ and $R_2$, the auxiliary impeller $I_a$ and to enter the inter-blade spaces of the impeller I, to repeat the sequence.

When rotor O is rotating at the same speed as impeller I, there is no toroidal flow. The magnitude of the flow is always proportional to the differential of speed between O and I, it being assumed that I will be the faster member.

The core ring formed by the sections 101 to 105 guides the flow so as to avoid turbulence within the oil body, improving torque efficiency by preventing local surges and eddies in the toroidal stream.

The toroidal flow of oil in causing rotation of output rotor O imparts torque to the turbine output shaft 11. The reaction rotor blades 8 and 9 are so formed that the rotational component of flow from the exit spaces of rotor blades 7 now negative or backward with respect to the primary component first imparted to O by I, is reversed so that it can be applied in a forward direction to the blades of the impeller I.

The reaction rotors $R_1$ and $R_2$ are coupled by the one-way devices 16—14—13, 17—14'—13 so that they cannot rotate backward, hence affording a fulcrum means for the required reversal of the toroidal flow.

The flow energy remaining in the body of fluid delivered by the reaction rotors to the impeller inlet spaces is delivered to the impeller blades to increase the energy eventually applied by the impeller to the output turbine O.

The increase of the rate of impeller delivery increases the energy absorbed by the output rotor. At high differential speeds, the toroidal flow being greatest, the net energy so delivered is greatest, and the output rotor is at a lesser speed than the impeller. The result is torque multiplication, which would be at maximum when the output rotor would be stopped or nearly stationary when the impeller would be driven at maximum speed by the primary power source.

The reaction rotors $R_1$ and $R_2$ are capable of being driven forward when the reverse reaction force applied by the toroidal flow diminishes to zero.

The reaction blades 8 and 9 are given predetermined, different angularities so that they may reach the zero reaction force point separately.

The auxiliary impeller $I_a$ has its blades and the one-way clutch 18—19—20 so arranged that when the rate of toroidal flow is relatively high with respect to the absolute speed of the impeller, the rotor $I_a$ may rotate forwardly faster than the impeller I, and thereby relieve the flow of a portion of the losses. The rotor $I_a$ spins forward freely during the drive interval of high torque, its blades 6 guiding the toroidal flow into the inlet zone of the impeller blades for avoidance of undesired turbulence at high toroidal flow velocities.

These characteristics are merged so that an overall acceleration from maximum torque multiplication to effective 1-to-1 drive between shafts 1 and 11 takes place. It should be understood that the drive combination of the invention is particularly adapted for fluid torque converters of the type which have an operating cycle from reduction ratios through a range of diminishing torque multiplication to 1-to-1 or direct coupled ratio. In actual practice, the converter of the present invention has an extremely low slip at vehicle speeds above 30 to 35 miles per hour.

Reviewing the operating sequence, in the diagram of Figs. 4 to 6, the active pressure lines are shown in full line and the inactive lines in dashed line. The front pump P is shown, driven by the gears 24, 25 of Fig. 1, and the rear pump Q driven by shaft 60. In the lower center of these diagrams a single feed pipe 156 is shown connected to passage 226 between the check valve assembly CV and CV', the lines 221 and 220 each connecting to the check valve seat openings.

The upper leg 156 of the check valve passage 151 is joined to the port 155 of the pressure regulator valve 150. Passage 220 from the rear pump Q is exposed to the ported face of the valve CV', the pumps operating individually and jointly to provide the system under all drive conditions. Annular port space 149 of the valve 150 is connected by passage 151 leading from the front pump P.

Pump Q supplies no pressure when the vehicle is stopped, and pump P driven by the engine, supplies pressure to unseat valve CV and admit pressure to passages 226 and 156.

The ratio control valve 230 has two pressure input ports 232 and 237, and vents at the open space to the left and at port 234. The delivery ports 235, 236 direct the pressure to establish low gear drive 253 for reverse and 231 for direct drive. Port 153 supplies the working space pressure for the converter through passages $23b$ and 168, and orifice 223.

Passages 141, 133, 79 supply the low ratio brake cylinder 69, and passages 202, 139 and 140 lead to the direct clutch cylinder 49 between the seals 46 and 47 inside the drum 37. Passages 148, $148a$ lead to the reverse brake cylinder 92.

Fig. 4 shows the low gear range drive positions and conditions of these pressure control elements, Fig. 5 those for reverse drive and Fig. 6 for direct. In these diagrams the clutch feed line 140 is equipped with check valve 131 for admitting air to the line; and a second check valve 137 is shown mounted in the clutch piston 44, the latter relieving that oil which would be trapped under centrifugal force, should the clutch be desired to be disengaged at high speeds of the clutch members. Valve 137 is seated by pressure of plates 40—45.

Thought should be given to the uses of the cooler C of Fig. 7, located between passages 165 and 165'. The torque converter W during normal operation generates a variable pressure in the oil of its working space. This pressure therefor endeavors to relieve toward the pump feed passages 168 and $23b$, where it meets the restriction orifice 223; and to relieve toward outlet passages 165, 165' between which the cooler C is located. The detail of the cooler construction is not shown, but it will be understood that the net effect of especially restricted cooler passages is to impede or slow down an outlet flow of more than a given pressure-velocity factor in accordance with the coldness of the oil. The invention contemplates utilization of restricted cooler passages to assist in stabilizing the flow of working space fluid against fluctuations caused by oil temperature variations and by surges in converter generated pressure. The pump system, controlled by regulator valve 150 provides a pressure level and a reasonably steady capacity flow to the converter working space, where the impellers acting as pumps, initially contribute a fraction of flow energy to the oil body, and where under other drive conditions, the generated working space pressure levels out to a steady value.

In the foregoing description, objects and advantages, the specification has brought out in detail the special features of the present invention as they provide the stated useful results believed novel herein. The overall advantage of the present invention is the extraordinary facility provided the car driver for obtaining completely smooth acceleration from standstill to approximate 1-to-1 drive in repeated drive change cycles, without torque interruption on overheating, as well as the ability to change from one driving range to another during such acceleration, with a drive mechanism so controlled that there is no effective interruption of the drive during shift transition from either range to the other. Further advantages provided by the construction and the inventive combinations embodied herein are likewise obtained in the extra facility for changing the drive between forward and reverse. It should be understood that the torque capacity characteristics of the torque converter used in the present demonstration, combined with those of the gear unit are necessarily related to the ability of the vehicle engine to drive the vehicle load, at designed speed ranges; and therefore the successful adaptation of the present invention in various drive problems must include factors directly based on these considerations. It is possible to correlate these factors so that maximum acceleration performance is obtainable without overheating in either of the low or the high speed driving range, so that one design of vehicle drive may reserve the low speed ratio range for maximum performance, while utilizing the high speed range for economy operation. These remarks are merely for the purpose of indicating the very special flexibility of application provided by the present invention.

It is not believed that heretofore in this art there has appeared a torque converter and gear drive combination which possessed the ability to permit repeated full torque shifts between two driving ratio ranges over the complete scale of torque converter drive ratio extending from initial reduction to approximately 1-to-1 top ratio, with the facility for free choice between the two ranges by the driver, for meeting unusual traffic conditions, in which the construction embodies the above-described features of the fluid pressure system.

The application of the invention may obviously take many forms but the principles and features herein described when included in such forms would represent the present invention and therefore while this specification has described and illustrated one practical and useful embodiment of the combinations of the invention, it is to be understood that the invention is in no way limited to the constructional details given herein, and that the invention may be varied as noted without departing from the spirit and scope of the following claims which state the combinations of the invention sought to be secured by U. S. Letters Patent.

I claim:

1. In a hydrodynamic torque transfer device, an impeller and a turbine in a working space adapted to be filled with liquid, means for supplying liquid under pressure to the working space, a pressure-responsive relief valve for permitting or restricting flow from the working space and thereby maintaining a predetermined pressure in the working space, a passage for conducting liquid from the relief valve, a lubrication system for said device connected to the passage and a restricted conduit from the working space around the relief valve to the passage to conduct liquid to the lubrication system when the relief valve is closed.

2. In a hydrodynamic torque transfer device, an impeller and a turbine in a working space adapted to be filled with liquid, means for supplying liquid under pressure to the working space, a pressure-responsive relief valve for permitting or restricting flow from the working space and thereby maintaining a predetermined pressure in the working space, a passage for conducting liquid from the relief valve, a lubrication system for said device connected to the passage, a restricted conduit from the working space around the relief valve to the passage to conduct liquid to the lubrication system when the relief valve is closed, and a second relief valve connected to the passage for maintaining a predetermined pressure in the lubricating system lower than the pressure in the working space.

3. In a hydrodynamic torque transfer device, an impeller and a turbine in a working space adapted to be filled with liquid, means for supplying liquid under pressure to the working space, a conduit including a cooler for conducting liquid from the working space, a pressure-responsive relief valve for permitting or restricting flow from the cooler and thereby maintaining a predetermined pressure in the working space, a passage for conducting liquid from the relief valve, a lubrication system for said device connected to the passage, and a restricted conduit from the working space around the relief valve to the passage to conduct liquid to the lubrication system when the relief valve is closed.

References Cited in the file of this patent
UNITED STATES PATENTS

| | | |
|---|---|---|
| 1,910,697 | Kiep | May 23, 1933 |
| 1,915,547 | North et al. | June 27, 1933 |
| 2,074,346 | Sinclair | Mar. 23, 1937 |
| 2,176,105 | Schneider | Oct. 17, 1939 |
| 2,322,577 | Kuhns et al. | June 22, 1943 |
| 2,332,593 | Nutt et al. | Oct. 26, 1943 |
| 2,343,304 | La Brie | Mar. 7, 1944 |
| 2,343,955 | Cotterman | Mar. 14, 1944 |
| 2,516,203 | Greenlee et al. | July 25, 1950 |
| 2,558,976 | O'Leary | July 3, 1951 |
| 2,638,746 | Kelley | May 19, 1953 |
| 2,740,257 | Carnagua | Apr. 3, 1956 |